United States Patent [19]
Cox et al.

[11] Patent Number: 5,993,952
[45] Date of Patent: Nov. 30, 1999

[54] DOCUMENT FEEDING COMPONENT AND METHOD OF MANUFACTURE THEREOF

[75] Inventors: Debra A. Cox, Baltic; William D. Smith, Abington, both of Conn.

[73] Assignee: World Properties, Inc., Lincolnwood, Ill.

[21] Appl. No.: 08/999,415

[22] Filed: Dec. 29, 1997

[51] Int. Cl.⁶ .............. B32B 3/26; C08F 14/00; B65H 3/06
[52] U.S. Cl. .............. 428/305.5; 521/149; 521/145; 521/189; 271/109; 271/275; 428/906
[58] Field of Search .................. 521/145, 149, 521/189; 428/305.5, 906; 271/109

[56] References Cited

U.S. PATENT DOCUMENTS

| | | | |
|---|---|---|---|
| 3,691,113 | 9/1972 | Willis | 260/2.5 R |
| 3,988,817 | 11/1976 | Thettu . | |
| 4,093,414 | 6/1978 | Swiatovy, Jr. | 425/113 |
| 4,173,058 | 11/1979 | Stieger | 29/895.32 |
| 4,252,378 | 2/1981 | DeBolt et al. | 301/63 DD |
| 4,287,649 | 9/1981 | Kohler | 492/56 |
| 4,303,721 | 12/1981 | Rodriguez | 428/213 |
| 4,372,246 | 2/1983 | Azar et al. | 118/60 |
| 4,812,357 | 3/1989 | O'Rell et al. | 428/246 |
| 5,089,851 | 2/1992 | Tanaka et al. | 355/219 |
| 5,347,927 | 9/1994 | Berna et al. | 101/401.1 |
| 5,363,176 | 11/1994 | Ishihara et al. | 355/219 |
| 5,609,554 | 3/1997 | Hayashi et al. | 492/56 |
| 5,666,606 | 9/1997 | Okano et al. | 399/174 |
| 5,765,077 | 6/1998 | Sakurai et al. | 399/176 |

Primary Examiner—James J. Seidleck
Assistant Examiner—Sanza McClendon
Attorney, Agent, or Firm—Cantor Colburn LLP

[57] ABSTRACT

A document feed component is presented comprising a foamed epichlorohydrin elastomer, a curing agent, and a blowing agent. The elastomer optionally further includes activators, polymerization accelerators, and a filler material. An important feature of the present invention is that the use of a foamed epichlorohydrin elastomer in accordance with the present invention does not require the use of processing aids and migratory additives. Consequently, the document feed component of this invention has the advantage of not contaminating paper or other media with which they come into contact, even for extended periods of time, while maintaining other advantageous properties, such as a high coefficient of friction, low hardness, low compression set, and excellent resistance to ultraviolet light and ozone. The document feed component of the present invention may be shaped as a roller, wheel, belt, pad or the like.

43 Claims, 1 Drawing Sheet

DOCUMENT FEEDING COMPONENT AND METHOD OF MANUFACTURE THEREOF

BACKGROUND OF THE INVENTION

1. Field of the Invention

This invention relates generally to the field of elastomeric rolls and the like used for feeding paper sheets, photographic paper or other documents and a method of manufacture thereof. More particularly, this invention relates to a new and improved sheet feeding roller or other member comprised of a foamed epichlorohydrin elastomer without processing aids and migratory additives, wherein the roller or other member is characterized by a high initial coefficient of friction and low hardness.

2. Brief Description of the Related Art

An enormous number of paper sheets and other documents such as currency, personal checks and films are handled by a variety of document handling devices, including office copiers, automatic teller machines, typewriters, printers, calculators, computers and many other types of business equipment. As used herein, the word "document" means any thin sheet of material, such as paper, including photographic paper, the other documents mentioned previously, and other similar sheets of material. Often associated with the document feeding of these devices are elastomeric rolls, wheels, pads, belts and the like, which act to convey the documents along a desired path. Documents are delivered into the document handling devices by the elastomeric feed components, such as a roll, through frictional force which develops from imparting motion to the feed roll while it is in contact with the document. The document is moved forward when the feed roll is rotated, if the frictional force is sufficiently high to prevent slippage. The frictional force increases with increased elastomer coefficient of friction (COF) and with increased normal force exerted on the elastomer/document interface.

Although the remaining description herein uses elastomeric feed rolls to illustrate the pertinent concepts, feed rolls are used to simplify the description of the field of document feeding, and not to imply any limitation of this geometry. It should be understood that the same concepts apply to wheels, belts, pads, and other geometries of components used for document feeding.

The use of an elastomeric material in the construction of a feed roll is well known in the art, and various elastomers have been used in the fabrication of feed rollers. For example, in U.S. Pat. No. 4,372,246 to Azar et al., there is disclosed a roll fusing member which is externally heated. The fusing element of the patent is made of a foam fluoroelastomer base and a thin layer of a silicone elastomer layer applied to the foam layer. The silicone elastomer layer contains an iron oxide filler.

U.S. Pat. No. 3,988,817 to Thettu discloses a pressure roll construction for use in heated pressure roll fusing apparatus. The pressure roll has an elastomeric core made of a silicone rubber covered with by a rigid, flexible sleeve which can be made of metal or fluoroethylene propylene. The sleeve is covered with an exterior coating made of silicone rubber.

In U.S. Pat. No. 4,173,058 to Stieger, there is disclosed a method for manufacturing photographic film processing rollers. An adhesive primer is applied to a cylindrical metal rod and a melted polymer comprising an elastomeric urethane resin on its surface is deposited on the metal rod by means of a cross-head extrusion die. The extruded coating is then hardened. U.S. Pat. No. 4,287,649 to Kohler also discloses a paper feeding roller made of a core of foamed cellular resilient material and an annular skin of a relatively hard elastic material disposed on the core.

Elastomeric feed rolls are made of hard, solid elastomers such as SBR (styrene butadiene rubber), neoprene, natural rubber, synthetic polyisoprene or several others. These solid elastomers possess high coefficient of friction and high compressive modulus. However, preferred document feed rolls comprise a low compression modulus (high compliance) cellular elastomer. These rolls result in large contact area (footprint) and low contact pressure. Document skewing and damage, and elastomer wear are eliminated or greatly reduced. Such feed rolls are commonly cellular polyurethane elastomers, one of which is described in U.S. Pat. No. 4,287,649 to Kohler.

One drawback to the use of the above mentioned materials is that these materials require the use of processing aids, plasticizers, and/or other additives when producing a solid elastomer feed roll. A processing aid is generally incorporated into the elastomer compound in order to promote flow of the compound under shear or heat. Commonly used processing aids include fatty acid soaps such as stearic acid, paraffinic materials, and low molecular weight polyethylene or other olefinic materials, among many others. A plasticizer is incorporated in the material to increase its workability, flexibility, or distensibility. Commonly used plasticizers include DOA (bis(2-ethylhexyl) adipate) and DOP (bis(2-ethylhexyl) phthalate), among many others. Other commonly-used migratory additives includes various surfactants and compatibilizers used to stabilize the foam and to compatibilize the elastomer blends. The above-described additives are migratory, and their use in solid elastomer feed rolls and other paper feeding components has been shown to impair the surface of photographic paper by marking the paper's surface when it is used in a paper feed device.

SUMMARY OF THE INVENTION

The above-described and other problems and deficiencies of the prior art are overcome or alleviated by the elastomeric document feed component and method for manufacturing the same of the present invention, comprising a foamed epichlorohydrin elastomer comprising an epichlorohydrin elastomer, a blowing agent and a curing agent. In addition, the present invention preferably includes cure activators, polymerization accelerators and a filler. The foamed epichlorohydrin elastomer sponge of the present invention provides a document feed component that has a high coefficient of friction, low hardness, low compression set, and excellent resistance to ultraviolet light and ozone. Furthermore, the feed component of the present invention provides excellent stability of the above-mentioned properties over extended periods of time.

An important feature of the present invention is that the use of a foamed epichlorohydrin elastomer sponge as a component of a document feed roller does not require the use of processing aids, plasticizers, and/or other migratory additives. The use of processing aids, plasticizers, and/or other migratory additives in elastomer feed rollers leads to displeasing markings on the surface of paper used in the feed device. In addition, the present feed component has all the desirable attributes of the prior art cellular elastomeric feed rolls with none of their limitations. Thus, the feed rolls of the present invention are superior to those known from the prior art and provide a more commercially attractive and valuable material.

These and other features of the invention will become better understood with reference to the following detailed description, drawings, and appended claims.

BRIEF DESCRIPTION OF THE DRAWINGS

For the purpose of illustrating the invention, there are shown in the drawing forms which are presently preferred, it being understood that this invention is not limited to the precise arrangements and instrumentalities shown. Referring now to the drawings wherein like elements are numbered alike in the several FIGURES.

DETAILED DESCRIPTION OF THE INVENTION

Figure 2:
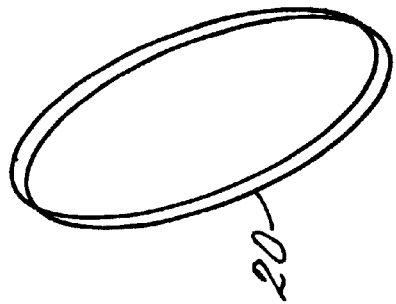
FIG. 2 is a side elevational view of the improved feed component of the present invention, wherein the feed component is in the form of a belt.

In the following description, the invention will be illustratively discussed as a paper feed component, but it will be understood that it is applicable to a document feeder for any sheet material.

The document feed component in accordance with the present invention comprises a foamed epichlorohydrin elastomer which itself comprises an epichlorohydrin elastomer, a blowing agent and a curing agent. In addition, the present invention optionally includes cure activators, polymerization accelerators and filler material. The document feed component of this invention does not require the use of processing aids, plasticizers, or other migratory additives. Even rollers made from mechanically frothed cellular elastomers, for example polyurethane, contaminate the surface of the paper used in the feeding device due to the presence of surfactants in the elastomeric compositions. The use of surfactants in these compositions is necessary because it provides stabilization to the cells in the cellular elastomers. Chemically blown materials are processed using the same processing aids and or plasticizers described above, and thus have the same disadvantages. Thus, by the removal of all processing aids, plasticizers, and migratory additives, the document feed component of the present invention has the advantage of not contaminating paper or other media with which it comes into contact, even for extended periods of time. Furthermore, the present invention is characterized by a high initial coefficient of friction and low hardness, without the use of plasticizers, and it exhibits excellent stability of these properties over an extended period of time.

Elastomer

In a preferred embodiment, the elastomer used in the document feed component of this invention is a foamed epichlorohydrin elastomer. One suitable elastomer is an epichlorohydrin terpolymer composed of about 70 weight % epichlorohydrin, about 30 weight % ethylene oxide, and about 6 weight % alkyl glycidyl ether, commercially available from Zeon Chemicals, Inc under the trade name HYDRIN T3100. Other suitable elastomers include the homopolymer of epichlorohydrin, the copolymer of epichlorohydrin and ethylene oxide, the aforementioned terpolymer in other ratios, and combinations thereof.

Blowing Agent

Blowing agents, sometimes referred to as foaming agents, generate cells in polymeric materials. During the expansion of the substrate by the blowing agent, cells are initiated and grow to produce the final foam. Preferred blowing agents in accordance with the present invention decompose around the cure temperature of the rubber, and include those known in the art such as azodicarbonamides, for example a modified activated azodicarbonamide commercially available from Uniroyal Chemical Company under the trade name Celogen 765; p,p'-oxybis(benzenesulfonyl hydrazide); p,p-oxybis(N-nitroso-N-methyl)benezenesulfonamide; or sodium bicarbonate. The blowing agent is present in an amount of between about 0.5 to about 5 pph, preferably in an amount of about 1 parts per hundred of elastomer (pph).

Curing Agent

The composition of the present invention further includes a curing agent, usually in the form of sulfur or a peroxide. Peroxide vulcanization occurs when the composition is heated and the peroxide decomposes to form free radicals, which then initiate crosslinking of the polymeric chains. Preferred peroxide curing agents are free radical cure initiators such as organic peroxides, e.g. dicumyl peroxide; p,p'-bis(t-butylperoxy)diisopropylbenzene; or 2,5-di(t-butyl-peroxy)hexane. Sulfur, an alternative curing agent to peroxides, creates bridges between the rubber chains during the vulcanization process and is the preferred curing agent in accordance with the present invention. Other suitable curing agents include sulfur derivatives such as ethylene thiourea, 2,5-dimercapto- 1,3,4-thiazole, trithiocyanuric acid, and 2,4, 6-trimercapto-s-triazine. The curing agent is provided in an amount of between about 0.3 to about 3 pph, and more preferably in an amount of about 0.5 pph.

Cure Activator

A cure activator is optionally included in the composition of the present invention to initiate cure. Preferred activators are known in the art, for example metal oxides such as zinc oxide, and metal stearates. The activator is provided in an amount of between about 3 to about 8 pph.

Cure Accelerators

The composition of the present invention may optionally include a cure accelerator. The polymerization accelerators suitable for use in the present invention include sulfides and dithiocarbamates, for example tetramethylthiuram disulfide (TMTD). Other suitable accelerators are tetramethylthiuram monosulfide (TMTM), tetraethylthiuram disulfide, mercaptobenzothiazole disulfide (MBTS), zinc di-n-butyldithiocarbamate, and zinc dimethyldithiocarbamate. If present, the cure accelerator is preferably used in an amount of about 1.0 to about 2.0 pph.

Filler

The elastomer of the present invention optionally includes filler material. The addition of filler reinforces the elastomer and improves its processability. Examples of preferred fillers include carbon blacks, e.g., 325 BA black (commercially available from Keystone Filler & Mfg. Co.), diatomaceous earth, clay, alumina, talc, silica, and calcium carbonate. It is preferred that if a filler material is used in the present invention, it is present in amounts ranging from about 5 to about 45 pph.

In the practice of the present invention, the foamed epichlorohydrin elastomer preferably defines a drive means for a document feeding device, the drive means having the shape of a roller, wheel, belt, pad or the like. Rollers and other shaped paper driving components having high coefficients of friction in accordance with the present invention result in minimum slippage over a service life; they also eliminate misfeeds and jams due to skewing and cause no document damage, e.g. paper contamination by contaminating additives.

Figure 1:
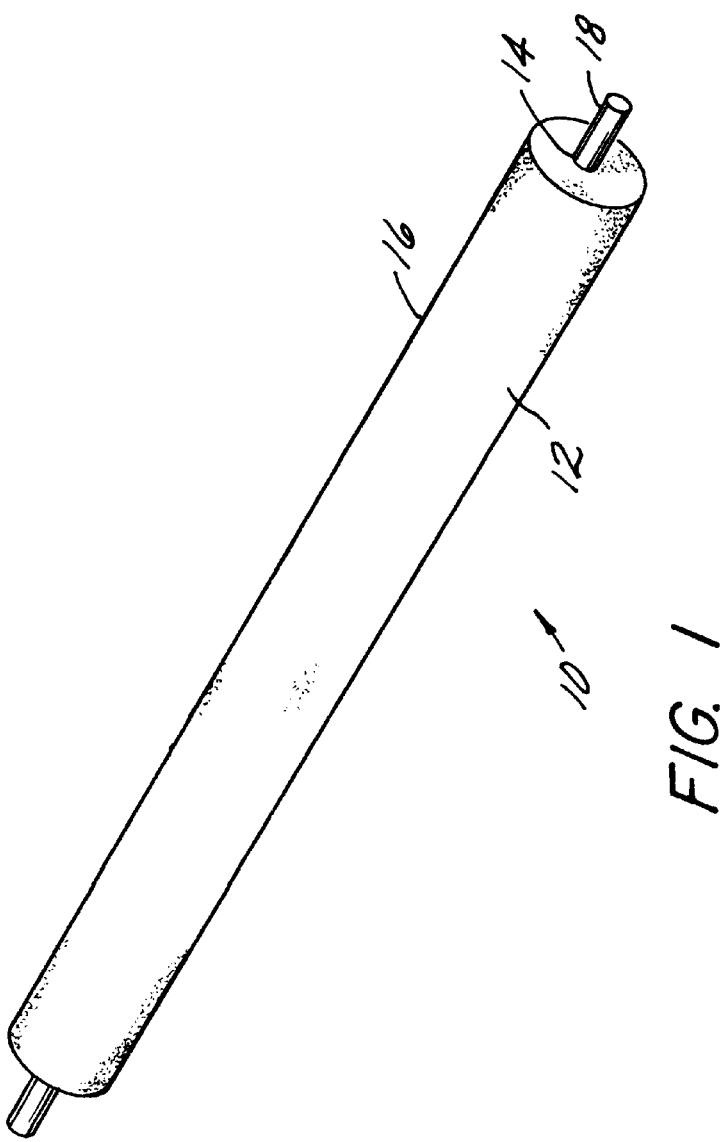
FIG. 1 is a side elevational view of one form of the improved roller of the present invention.

Referring now to FIG. 1, the improved roller 10 comprises a base 12 of foamed epichlorohydrin elastomer sponge, which has been cut to have a central shaft receiving opening 14 having shaft 18 disposed therein, and an outer cylindrical surface 16. The base 12 is an epichlorohydrin elastomer in accordance with the present invention. The cellular foam may have any desired density range which will give the feed component the above-mentioned characteristics, such ranges being between about 20 pounds per cubic foot to about 55 pounds per cubic foot.

Referring now to FIG. 2, a feed component of the present invention is illustrated in the form of a belt 20. Belt 20 comprises the foamed epichlorohydrin elastomer sponge in accordance with the present invention. The cellular foam may have any desired density range which will give the feed component the above-mentioned characteristics, such ranges being between about 20 pounds per cubic foot to about 55 pounds per cubic foot.

The document feeding component of the present invention may be manufactured by methods known to those of ordinary skill in the art. The components of the material are mixed, for example in an internal mixer such as a Banbury mixer. The material is extruded as a tube and cut to length, for example 10 inches. The tubes are then slid onto a steel mandrel and placed on a rack. Racks are loaded into an autoclave and cured, for example at 350° F. for 30 minutes under a pressure of 25 (pounds per square inch). The exact conditions may be empirically determined, especially the pressure applied during cure, and are adjusted to achieve a desired target foamed elastomer density. Following the autoclave cure, tubes are removed from the mandrels and postbaked for 4 hours at 250° F. For a roller in accordance with the present invention, the tubes are next ground, sliced, and glued to shafts as necessary for a particular roller design.

The following non-limiting examples further describe the document feed component of the present invention.

EXAMPLES

Chemicals, sources, and descriptions are listed in the Table below.

| Trade Name | Source | Description |
| --- | --- | --- |
| Hydrin T3100 | Zeon Chemicals Inc. | Epichlorohydrin/ethylene oxide/alkyl glycidyl ether |
| Elastozinc | Elastochem, Inc. | Zinc oxide |
| V(MT)D75 | Rheine Chamie | Tetramethylthiuram (TMTD) |
| 325 BA | Keystone Filler & Mfg. | Coal |
| PB(RM-S)-80 | Elastochem, Inc. | Sulfur |
| Celogen 765 | Uniroyal Chemical Co. | Modified activated azodicarbonamide |
| Hydrin T-65 | Zeon Chemicals | Epichlorohydrin/ethylene oxide/alkyl glycidyl ether |
| Hydrin T3106 | Zeon Chemicals | Epichlorohydrin/ethylene oxide/alkyl glycidyl ether |
| Hydrin 2000 | Zeon Chemicals | Epichlorohydrin/ethylene oxide copolymer |
| Hydrin 1000 | Zeon Chemicals | Epichlorohydrin homopolymer |

In a preferred embodiment of the present invention, the components in amounts listed in the Table below are mixed, for example in an internal mixer such as a Banbury mixer. The material is extruded as a tube and cut to length, for example 10". The tubes are then slid onto a steel mandrel and placed on a rack. Racks are loaded into an autoclave and cured, for example at 350° F. for 30 minutes under 25 psi pressure. The exact conditions may be empirically determined, especially the pressure applied during cure, and are adjusted to achieve a desired target foamed elastomer density. Following the autoclave cure, tubes are removed from the mandrels and postbaked for 4 hours at 250° F. The tubes are next ground, sliced, and glued to shafts as necessary for a particular roller design.

| Component | Amount (pph)* |
| --- | --- |
| Hydrin T3100 | 100 |
| Elastozinc | 5 |
| V(MT)D75 | 1.5 |
| 325 BA | 15 |
| PB(RM-S)-80 | 0.5 |
| Celogen 765 | 1 |
| Celite 350 | 15 |

*parts per hundred of resin (rubber)

As discussed earlier, the roller in accordance with the present invention is aptly suited for use in conjunction with any number of standard devices employing a paper feeding component such as photocopiers, printers and automatic teller machines to name just a few, without contamination of paper or film. It has advantageous properties, such as coefficient of friction, in order to adequately grip the paper and drive it along the desired path without slippage or skewing. The high compliance results in high contact area and low pressure between the roller and the document to be fed, as well as good mechanical wear and resistance properties. The use of an epichlorohydrin elastomer provides such desired properties and thereby results in an improved document feeding component.

While preferred embodiments have been shown and described, various modifications and substitutions may be made thereto without departing from the spirit and scope of the invention. Accordingly, it is understood that the present invention has been described by way of illustrations and not limitation.

What is claimed is:

1. In a document handling device having a document feed component, the improvement comprising the document feed component comprising a foamed epichlorohydrin comprising an epichlorohydrin elastomer portion, a blowing agent, and a curing agent.

2. The document handling device of claim 1, wherein the epichlorohydrin elastomer portion is a terpolymer, copolymer or homopolymer of epichlorohydrin.

3. The document handling device of claim 1, wherein the epichlorohydrin elastomer portion is a terpolymer of epichlorohydrin, ethylene oxide, and alkyl glycidyl ether, or a copolymer of epichlorohydrin and ethylene oxide monomer.

4. The document handling device of claim 1, wherein:
the curing agent is an organic peroxide, sulfur, ethylene thiourea, 2,5 dimercapto-1,3,4-thiazole, trithiocyanuric acid, 2,4,6-trimercapto-s-triazine, or a mixture thereof.

5. The document handling device of claim 1, wherein:
the blowing agent is an azodicarbonamides, p,p'-oxybis (benzenesulfonyl hydrazide), p,p-oxybis(N-nitroso-N-methyl)benezenesulfonamide, sodium bicarbonate, or a combination thereof.

6. The document handling device of claim 1, further comprising
a cure accelerator, a cure activator, filler, or any combination thereof.

7. The document handling device of claim 6, wherein the cure activator is a metal oxide or metal stearate.

8. The document handling device component of claim 7, wherein
the metal oxide is zinc oxide.

9. The document handling device of claim 6, wherein the cure accelerator is tetramethylthiurum disulfide, tetramethylthirum monosulfide, tetraethylthiram disulfide, mercaptobenzothiazole disulfide, zinc di-n-butyldithiocarbamate, zinc dimethyldithiocarbamate, or a combination thereof.

10. The document handling device of claim 6, wherein:
the filler is carbon black, diatomaceous earth, clay, alumina, talc, silica, calcium carbonate, or a combination thereof.

11. The document handling device of claim 1, wherein the component has the shape of a roller, wheel, belt, or pad.

12. In a document handling device having a document feed component, the improvement comprising the document feed component, comprising a foamed epichlorohydrin comprising an epichlorohydrin elastomer portion, a blowing agent, a curing agent, a cure accelerator, a cure activator, and filler.

13. The document handling device of claim 12, wherein the epichlorohydrin elastomer portion is a terpolymer, copolymer or homopolymer of epichworohydrin.

14. The document handling device of claim 13, wherein the epichiorohydrin elastomer portion is a terpolymer of epichlorohydrin, ethylene oxide, and alkyl gycydil ether, or a copolymer of epichiorohydrin and ethylene oxide monomer.

15. The document handling device of claim 12, wherein: the curing agent is an organic peroxide, sulfur, ethylene thiourea, 2,5 dimercapto-1,3,4-thiazole, trithiocyanuric acid, 2,4,6-trimercapto-s-triazine, or a mixture thereof.

16. The document handling device of claim 12, wherein: the blowing agent is an azodicarbonamides, p,p'-oxybis(benzenesulfonyl hydrazide), p,p-oxybis(N-nitroso-N-methyl)benezenesulfonamide, sodium bicarbonate, or a combination thereof.

17. The document handling device of claim 12, wherein the cure activator is a metal oxide or metal stearate.

18. The document handling device of claim 17, wherein the metal oxide is zinc oxide.

19. The document handling device of claim 12, wherein the cure accelerator is tetramethylthiurum disulfide, tetramethylthiuram monosulfide, tetraethylthirum disulfide, mercaptobenzothiazole disulfide, zinc di-n-butyldithiocarbamate, zinc dimethyldithiocarbamate, or a combination thereof.

20. The document handling device of claim 12, wherein: the filler is carbon black, diatomaceous earth, clay, alumina, talc, silica, calcium carbonate, or a combination thereof.

21. The document handling device of claim 12, wherein the component has the shape of a roller, wheel, belt, or pad.

22. In a document handling device having a document feed component, the improvement comprising the document feed component consisting essentially of a foamed epichiorohydrin elastomer portion, a blowing agent, and a curing agent.

23. The document handling device of claim 22, wherein the epichlorohydrin elastomer portion is a terpolymer, copolymer or homopolymer of epichlorohydrin.

24. The document handling device of claim 23, wherein the epichiorohydrin elastomer portion is a terpolymer of epichlorohydrin, ethylene oxide, and alkyl gycydil ether, or a copolymer of epichlorohydrin and ethylene oxide monomer.

25. The document handling device of claim 22, wherein: the curing agent is an organic peroxide, sulfur, ethylene thiourea, 2,5 dimercapto-1,3,4-thiazole, trithiocyanuric acid, 2,4,6-trimercapto-s-triazine, or a mixture thereof.

26. The document handling device of claim 22, wherein: the blowing agent is an azodicarbonamides, p,p'-oxybis(benzenesulfonyl hydrazide), p,p-oxybis(N-nitroso-N-methyl)benezenesulfonamide, sodium bicarbonate, or a combination thereof.

27. The document handling device of claim 22 further consisting essentially of a cure accelerator, a cure activator, filler, or any combination thereof.

28. The document handling device of claim 27, wherein the cure activator is a metal oxide or metal stearate.

29. The document handling device of claim 28, wherein the metal oxide is zinc oxide.

30. The document handling device of claim 27, wherein the cure accelerator is tetramethylthiuram disulfide, tetramethylthiuram monosulfide, tetraethylthiram disulfide, mercaptobenzothiazole disulfide, zinc di-n-butyldithiocarbamate, zinc dimethyldithiocarbamate, or a combination thereof.

31. The document handling device of claim 27, wherein: the filler is carbon black, diatomaceous earth, clay, alumina, talc, silica, calcium carbonate, or a combination thereof.

32. The document handling device of claim 22, wherein the component has the shape of a roller, wheel, belt, or pad.

33. In a document handling device the improvement comprising the document feed component made by:
providing an epichlorohydrin elastomer precursor solution comprising an epichlorohydrin elastomer portion, a blowing agent and a curing agent;
foaming the elastomer precursor solution; and
curing the foamed solution.

34. The method of claim 33, wherein the epichlorohydrin elastomer portion is a terpolymer, copolymer or homopolymer of epichlorohydrin.

35. The method of claim 34, wherein the epichlorohydrin elastomer portion is a terpolymer of epichlorohydrin, ethylene oxide, and alkyl glycidyl ether, or a copolymer of epichlorohydrin and ethylene oxide monomer.

36. The method of claim 33, wherein the curing agent is an organic peroxide, sulfur, ethylene thiourea, 2,5 dimercapto-1,3,4-thiazole, trithiocyanuric acid, 2,4,6-trimercapto-s-triazine, or a mixture thereof.

37. The method of claim 33, wherein the blowing agent is an azodicarbonamides, p,p'-oxybis(benzenesulfonyl hydrazide), p,p-oxybis(N-nitroso-N-methyl)benezenesulfonamide, sodium bicarbonate, or a combination thereof.

38. The method of claim 33, wherein the precursor solution further comprises a cure accelerator, a cure activator, filler, or any combination thereof.

39. The method of claim 38, wherein the cure activator is a metal oxide or metal stearate.

40. The method of claim 38, wherein the metal oxide is zinc oxide.

41. The method of claim 38, wherein the cure accelerator is tetramethylthiuram disulfide, tetramethylthiuram monosulfide, tetraethylthiram disulfide, mercaptobenzothiazole disulfide, zinc di-n-butyldithiocarbamate, zinc dimethyldithiocarbamate, or a combination thereof.

42. The method of claim 38, wherein the filler is carbon black, diatomaceous earth, clay, alumina, talc, silica, calcium carbonate, or a combination thereof.

43. The method of claim 33, wherein the component has the shape of a roller, wheel, belt, or pad.

* * * * *